(12) United States Patent
DeKoven

(10) Patent No.: US 12,542,668 B2
(45) Date of Patent: Feb. 3, 2026

(54) SECURE AUTHENTICATION OF ELECTRONIC DOCUMENTS VIA A DISTRIBUTED SYSTEM

(71) Applicant: Justice Technology, Ltd., Calistoga, CA (US)

(72) Inventor: Ronald DeKoven, Calistoga, CA (US)

(73) Assignee: Justice Technology, Ltd., Calistoga, CA (US)

( * ) Notice: Subject to any disclaimer, the term of this patent is extended or adjusted under 35 U.S.C. 154(b) by 206 days.

(21) Appl. No.: 18/193,608

(22) Filed: Mar. 30, 2023

(65) Prior Publication Data

US 2023/0318835 A1 Oct. 5, 2023

Related U.S. Application Data

(60) Provisional application No. 63/374,342, filed on Sep. 1, 2022, provisional application No. 63/326,251, filed on Mar. 31, 2022.

(51) Int. Cl.
*H04L 9/32* (2006.01)
*G06F 21/62* (2013.01)
*H04L 9/00* (2022.01)

(52) U.S. Cl.
CPC ........ *H04L 9/3213* (2013.01); *G06F 21/6218* (2013.01); *H04L 9/3218* (2013.01); *H04L 9/50* (2022.05)

(58) Field of Classification Search
CPC ..... G06F 16/182; G06F 16/93; H04L 9/3247; H04L 9/50
See application file for complete search history.

(56) References Cited

U.S. PATENT DOCUMENTS

| | | | |
|---|---|---|---|
| 2021/0281421 A1* | 9/2021 | Semenovskiy | G06Q 20/3276 |
| 2022/0239495 A1* | 7/2022 | Norton | H04L 9/0825 |
| 2023/0108366 A1* | 4/2023 | Tang | G06Q 20/3829 |
| | | | 705/66 |
| 2024/0171414 A1* | 5/2024 | Johnson | H04L 9/50 |

* cited by examiner

*Primary Examiner* — Olugbenga O Idowu
(74) *Attorney, Agent, or Firm* — Fenwick & West LLP

(57) ABSTRACT

A document authentication system securely saves documents and permits later verification of the authenticity of those documents. When saving a document, the documents are memorialized to tamper-proof private distributed storage, and a token is generated for the document and saved in a private distributed ledger. Any subsequent documents serving to modify the content of the original document, or to attest to the trustworthiness of the original documents, are saved in a similar manner, with the document itself also being saved to the private distribute storage, and a token for the document being saved in the private distributed ledger in association with the token of the original document. Verification of the original document is performed by locating the original document (and any of its related subsequent documents) in the private distributed storage, by finding the tokens corresponding to those documents within the private distributed ledger.

17 Claims, 2 Drawing Sheets

SECURE AUTHENTICATION OF ELECTRONIC DOCUMENTS VIA A DISTRIBUTED SYSTEM

RELATED APPLICATIONS

This application claims the benefit of Provisional Application No. 63/326,251, filed on Mar. 31, 2022, and of Provisional Application 63/374,342, filed on Sep. 1, 2022, both of which are incorporated herein by reference.

FIELD OF ART

This disclosure relates generally to the field of distributed software systems, and more specifically, to verifying the authenticity of electronic documents via distributed computing and cryptographic techniques.

BACKGROUND

The ability to store electronic documents and to enable verification of their authenticity is of fundamental importance in many areas. For example, in the event of a severe medical event, it is of critical importance to be able to determine whether the patient has registered any medical instructions (e.g., a "do not resuscitate" form), and (if so) to ensure that those instructions are authentic (that is, originate with the patient, and have not been altered or otherwise tampered with by unauthorized third parties). Even when there appears to be a document executed by or on behalf of a person in question, there may still be a question of whether the execution was genuine, or whether terms of the document have been altered since execution.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
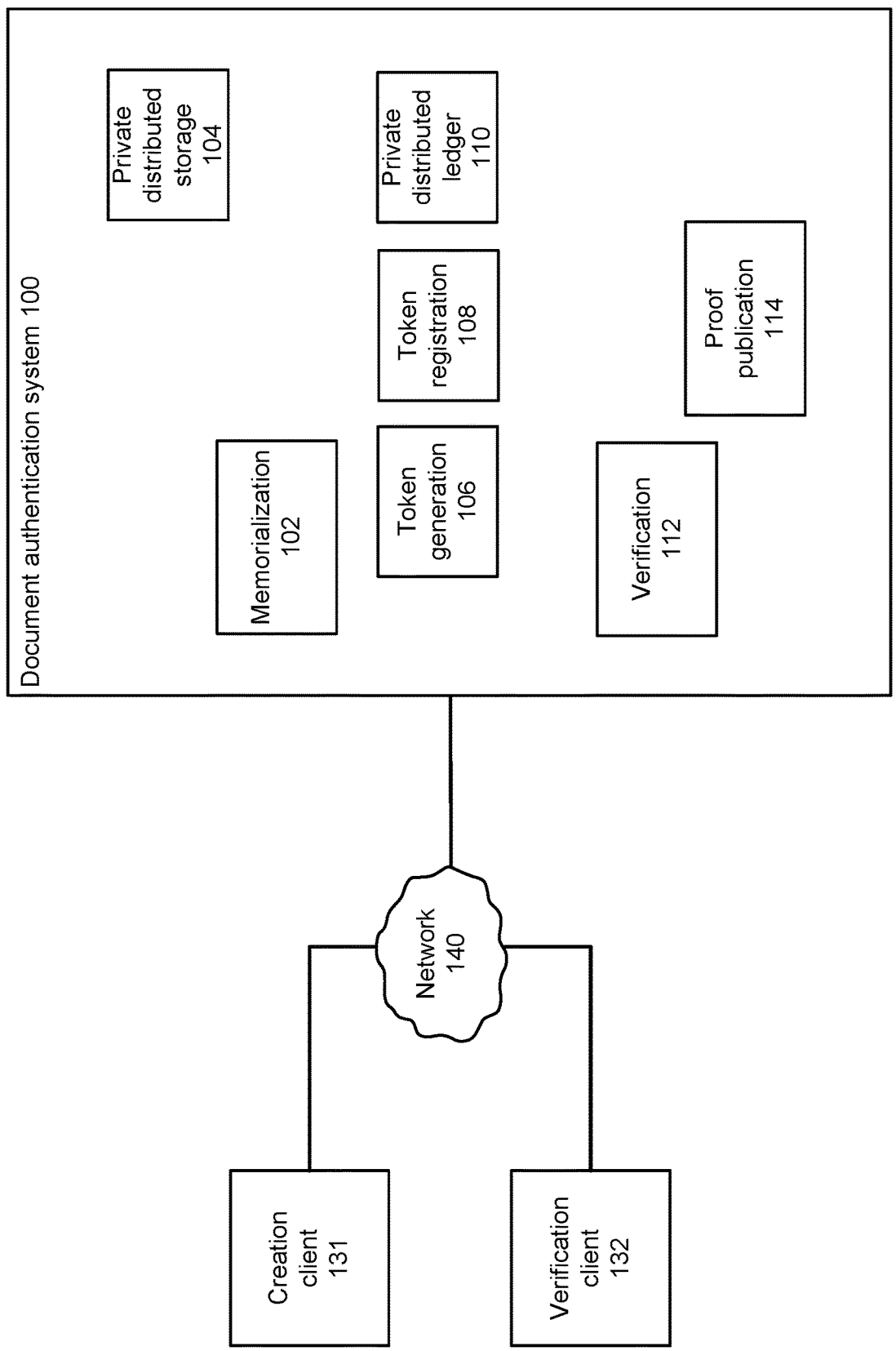
FIG. 1 illustrates a detailed view of an environment in which documents are memorialized and their authenticities verified, according to one embodiment.

FIG. 1 illustrates a detailed view of an environment in which documents are memorialized and their authenticities later verified, according to one embodiment. A document system 100 provides such memorialization and verification services to users, such as a user of a creation client device 131 from which documents are submitted to the document authentication system 100 for memorialization, and a user of a verification client device 132 that requests verification of the authenticity of such documents.

The document authentication system 100 is implemented in different manners in different embodiments. For example, in one embodiment the system 100 is made available as a remote network-based service, supporting clients from different organizations at any location in the world. In other embodiments, the system 100 is implemented as enterprise software, with the system 100 being installed internally to each of many different organizations, such that each organization has its own independent instance of the system 100 that is accessible to its own clients but inaccessible from outside the organization.

The document authentication system 100 has, or accesses, a number of components, including a memorialization module 102, a verification module 112, a token generation module 106, a token registration module 108, a private distributed ledger 110, and private distributed storage 104. These components are now described in additional detail.

The memorialization module 102 obtains a document from the creation client device 131 and memorializes it so that it is reliably saved and its authenticity verifiable. The documents may be of any type of electronic file format, such as Microsoft™ Word™ or Excel™ Portable Document Format (PDF), image (e.g., JPEG or TIFF), audio (e.g., MP3), or video (e.g., MP4 or AVI), as just some examples. The documents may have been executed to indicate that those executing the documents are certifying that the documents are authentic, such as through digital signing via an electronic service (e.g., Adobe™ Sign™), or through physical ink signatures on hardcopies of the documents.

In one embodiment, the user of the creation client device 131 uses a graphical user interface to specify the document (s) to be memorialized—e.g., using a file chooser control of a web page of the system 100—as well as metadata for the document(s), such as title, description, document date, date of document signing, and/or comments, which is saved along with the document(s). In some embodiments, the memorialization module 102 analyzes the document(s) to be memorialized, extracts metadata (e.g., with text processing to determine the purpose of a document (such as a medical power of attorney document), or image analysis to determine the subject of a document containing an image), and pre-populates the metadata within the graphical user interface.

In some embodiments, the user interface additionally facilitates the memorialization of additional documents accompanying the primary document(s), such as an attestation document that serves as additional evidence of the authenticity of the document. For example, in the case of an agreement document (e.g., a will) that the user is executing, the user interface might allow the user to take a video of herself orally attesting to the fact that the document is hers, and that the signature on the document is also hers, and automatically memorialize the video in association with (say) a digital image of each page of the agreement document.

In some embodiments, the memorialization module 102 additionally facilitates obtaining related documents from other persons, such as obtaining attestation documents establishing that those other persons also executed the documents in question. For instance, returning to the example of a will to which two witnesses added their signatures to attest to the veracity of the will signing, the memorialization module 102 can automatically send a message to the witnesses requesting them to use the system 100 to submit photos, videos, or other attestation documents (e.g., a photo of the witnesses with the will and making a gesture indicating that they did indeed sign the will, such as pointing to their signature on the will).

Once the document(s), and any additional accompanying documents, are specified, the memorialization module 102 performs several actions to memorialize those documents. First, the memorialization module 102 stores the documents in a distributed storage 104 that securely stores the documents in a permanent and tamper-proof manner. In some embodiments, the distributed storage 104 is implemented using the InterPlanetary File System (IPFS) distributed file storage protocol, in which documents are replicated across the set of systems participating in IPFS. In some such embodiments, private IPFS is used, such that only a designated set of users (e.g., the set of users that have accounts on the system 100, or a subset thereof) have access to the distributed storage 104. The distributed storage 104, although conceptually illustrated in FIG. 1 as part of the system 100, may be implemented on a separate system, such as on a private virtual private network (VPN) within a cloud service networks, such as Amazon Web Services™, Google Cloud Platform™, or Microsoft Azure™.

In some embodiments, the memorialization module 102 encrypts the documents being memorialized before saving them to the distributed storage 104, so that they are encrypted at rest. Encryption may be performed using a symmetric key algorithm, such as AES-256. In some embodiments, each different user is issued a distinct encryption key (and, optionally, also each different document of a user may also have a different encryption key), which increases security by ensuring that even if a particular encryption key is compromised, the others remain safe.

In embodiments using IPFS for the distributed storage 104, the original documents that were memorialized can be recovered even if one system making up the distributed storage is compromised and accessed by malicious, unauthorized third parties, due to the inability of any one actor to tamper with data without being detected by a mismatching hash value.

The memorialization module 102 additionally uses a token generation module 106 to generate, for each document to be memorialized, a token uniquely identifying that document (that is, a non-fungible token (NFT)). The token for a document includes a reference to the location of the document stored in the distributed storage 104, so that the document can be retrieved by anyone having access to the distributed storage.

The memorialization module 102 uses the token registration module 108 to store each of the tokens in a private distributed ledger 110. In some embodiments, the distributed private ledger 110 is implemented using a blockchain-based system, such as Quorum™ or Polygon™. The tokens, when stored in the ledger 110, are unique (due to the way in which they are generated by the token generation module 106) and cannot be modified (due to blockchain's hashes of prior blocks in a chain, such that modifications to prior blocks will be reflected as hash discrepancies). Unlike traditional NFTs, the tokens are "immobilized" so that they cannot be traded.

Although the existence of a memorialized document cannot be removed due to the immutable nature of data within the ledger 110, additional documents representing a change to it (such as new versions, or modifications to portions of the document) may be memorialized in the same manner as the memorialized document itself, and linked to the memorialized document within the ledger 110 to make the relationship between the original and subsequent documents explicit. When creating the link between the prior document being changed and an additional document, the memorialization module 102 may aid the creating user by identifying candidate documents to which to link back the additional document, such as by comparing content or metadata of the additional document and various other documents stored for the creating user within the private distributed storage 104. For example, the memorialization module 102 could find the tokens previously recorded for the creating user within the private distributed ledger 110, use the data in those tokens to locate the corresponding documents in the private distributed storage, and then compare the content or metadata of the additional documents to those documents to identity potential matches. E.g., in the case where the additional document is a codicil to a will, the memorialization module 102 could identify the testator, determine that the document pertains to a will, and analyze the various other documents to identify which of those documents also pertain to a will and involve the testator, presenting any such documents to the creating user as possible documents to which to link the additional document.

The document authentication system 100 additionally includes a verification module 112 that can be used by the verification client 132 to verify the authenticity of a given document (that is, that the document was indeed memorialized, and executed, by or on behalf of the creating user, and has not been further modified since memorialized, other than by separately-memorialized related documents linking to it). (In some embodiments, only the creating user—or those to whom the creating user or document authentication system 100 has granted access to the creating user's account, such as administrators of the creating user's will— is permitted to verify the authenticity of the creating user's documents. In such embodiments, the verifying user is the same as the creating user.) In some embodiments, the verification module 112 provides a graphical user interface that displays to the verifying user the various documents that the memorialization module 102 has memorialized for the creating user, and the verifying user selects one of these documents and uses the graphical user interface to request verification of the authenticity of the selected document.

Once the verification module 112 has located the appropriate token within the ledger 110 for the memorialized document to be verified, it can use the link in the token to look up the memorialized document within the distributed storage 104. The fact that the token is in a block of the ledger establishes that the token was indeed issued at the time corresponding to the block's timestamp, and the token in turn indicates that the creating user considered the corresponding document to be authentic.

In addition to verifying the memorialized document itself, the verification module 112 can also verify attesting documents (if any) to further verify the authenticity of the document. In some embodiments, the verification module 112 identifies any additional related documents memorialized in the private distributed storage 104 by traversing the chain in the private distributed ledger 110 for the token for the document being verified by identifying any other tokens pointing back to the token for the document being verified. By virtue of the recording of their corresponding tokens in the private distributed ledger, the attesting documents are likewise verified as authentic, and the statements made by the documents (e.g., a visual affirmation of the execution of the original document) are thus credible.

In some embodiments, the verification module 112 uses a proof publication module 114 to publish a certification of successful verification that others can view. For example, the proof publication module 114 can create a web page that is available to specified third parties. The web page can display data such as the document itself or a portion thereof, metadata of the document, metadata or other details of the token, the hashes or checksums that prove that the document corresponds to the token, any signature authentication data, and/or any document history data.

The client devices 131, 132 are computing devices such as smart phones, tablet computers, laptop computers, desktop computers, or any other device that can interface with the document authentication system 100.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 2:
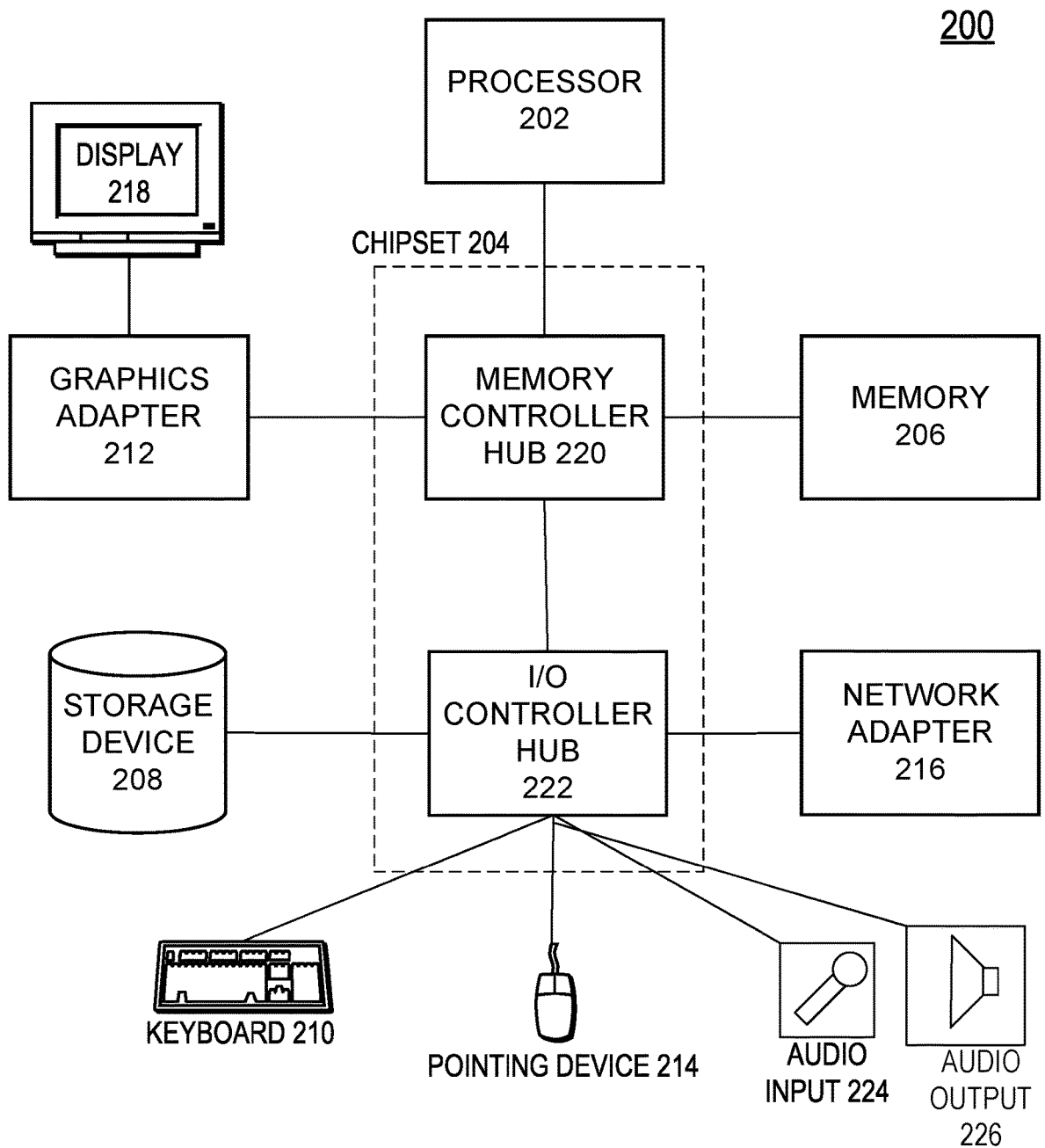
FIG. 2 is a high-level block diagram illustrating physical components of a computer used as part or all of the document authentication system from FIG. 1, according to one embodiment.

FIG. 2 is a high-level block diagram illustrating physical components of a computer 200 used as part or all of the document authentication system 100 from FIG. 1, according to one embodiment. Illustrated are at least one processor 202 coupled to a chipset 204. Also coupled to the chipset 204 are a memory 206, a storage device 208, a graphics adapter 212, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The graphics adapter 212 displays images and other information on the display 218. The network adapter 216 couples the computer 200 to a local or wide area network. The keyboard 210 and point device 214 allow a user to manually provide input. The audio input (e.g., microphone) 224 and output (e.g., internal or external speaker) 226 provide the ability obtain sound input (e.g., for speech recognition) and produce sound output.

As is known in the art, a computer 200 can have different and/or other components than those shown in FIG. 2. In addition, the computer 200 can lack certain illustrated components. In one embodiment, a computer 200 acting as a server may lack a graphics adapter 212, and/or display 218, as well as a keyboard 210, pointing device 214, and/or audio input 224 and output 226. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A computer-implemented method for securely authenticating electronic documents over a distributed system, the computer-implemented method comprising:
    obtaining, from a user, an electronic document;
    encrypting the electronic document using a symmetric key corresponding to the user;
    storing the encrypted electronic document within an Inter-Planetary File System (IPFS) distributed storage system, the IPFS distributed storage system being private;
    generating a non-fungible token (NFT) representing the electronic document and pointing to a location at which the electronic document was stored within the IPFS distributed storage system;
    storing the NFT in a private blockchain;
    obtaining, from the user, a request to establish verification of authenticity of the electronic document for a given set of verifying users;
    locating, within the private blockchain, the stored NFT;
    obtaining, from the stored NFT, the location at which the electronic document was stored within the IPFS distributed storage system;
    locating the electronic document in the IPFS distributed storage system using the location;
    searching the private blockchain for a second NFT associated with the user;
    identifying other electronic document stored in the IPFS distributed storage system that are pointed to by the second NFT; and
    analyzing content or metadata of the other identified electronic documents to identify a second electronic document to link to;
    generating a web page comprising a portion of at least one of the electronic document and the second electronic document and an indication of successful verification of the electronic document and the second electronic document;
    obtaining a request of a third party to verify authenticity of at least one of the electronic document and the second electronic document; and
    responsive to determining that the third party is within the set of verifying users, providing the generated web page to the third party.

2. A computer-implemented method for securely authenticating electronic documents over a distributed system, the computer-implemented method comprising:
    obtaining, from a user, an electronic document;
    storing the electronic document within an Inter-Planetary File System (IPFS) distributed storage system;
    generating a non-fungible token (NFT) representing the electronic document and pointing to a location at which the electronic document was stored within the IPFS distributed storage system;
    storing the NFT in a private blockchain;
    obtaining, from the user, a request to establish verification of authenticity of the electronic document;
    locating, within the private blockchain, the stored NFT;
    obtaining, from the stored NFT, the location at which the electronic document was stored within the IPFS distributed storage system;
    locating the electronic document in the IPFS distributed storage system using the location;
    searching the private blockchain for a second NFT associated with the user;
    identifying other electronic document stored in the IPFS distributed storage system that are pointed to by the second NFT; and
    analyzing content or metadata of the other identified electronic documents to identify a second electronic document to link to;
    generating proof data comprising a portion of at least one of the electronic document and the second electronic document and an indication of successful verification of at least one of the electronic document and the second electronic document.

3. The computer-implemented method of claim 2, further comprising:
    obtaining a request of a third party to verify authenticity of the electronic document; and
    responsive to determining that the third party is within a set of verifying users, providing the generated proof data to the third party.

4. The computer-implemented method of claim 2, wherein the IPFS distributed storage system is private.

5. The computer-implemented method of claim 2, wherein storing the electronic document within the IPFS distributed storage system comprises encrypting the electronic document using a symmetric key corresponding to the user prior to the storing.

6. The computer-implemented method of claim 2, wherein the request to establish verification of authenticity of the electronic document specifies a given set of verifying users, and wherein the proof data is a web page to which only the given set of verifying users is granted access.

7. The computer-implemented method of claim 2, wherein the user cannot trade the NFT over the distributed system.

8. The computer-implemented method of claim 2, further comprising:
    obtaining, from the user, the second electronic document embodying a change to the electronic document;
    storing the second electronic document within the IPFS distributed storage system;
    generating a second NFT representing the second electronic document, pointing to a location at which the second electronic document was stored within the IPFS distributed storage system, and referring to the NFT of the electronic document; and
    storing the second NFT in the private blockchain.

9. The computer-implemented method of claim 2, further comprising displaying, to the user, graphical representations of electronic documents stored in the IPFS distributed storage system that correspond to NFTs that are stored in the private blockchain in association with the user, wherein the user requests to establish verification of authenticity of the electronic document by selecting the electronic document from amongst the displayed graphical representations.

10. A computer system comprising:
    a computer processor; and a computer-readable storage medium storing instructions that when executed by the computer processor perform actions comprising:

obtaining, from a user, an electronic document;

storing the electronic document within an InterPlanetary File System (IPFS) distributed storage system;

generating a non-fungible token (NFT) representing the electronic document and pointing to a location at which the electronic document was stored within the IPFS distributed storage system;

storing the NFT in a private blockchain;

obtaining, from the user, a request to establish verification of authenticity of the electronic document;

locating, within the private blockchain, the stored NFT;

obtaining, from the stored NFT, the location at which the electronic document was stored within the IPFS distributed storage system;

locating the electronic document in the IPFS distributed storage system using the location;

searching the private blockchain for a second NFT associated with the user;

identifying other electronic document stored in the IPFS distributed storage system that are pointed to by the second NFT; and analyzing content or metadata of the other identified electronic documents to identify a second electronic document to link to;

generating proof data comprising a portion of the electronic document and an indication of successful verification of the electronic document.

11. The computer system of claim 10, the actions further comprising:

obtaining a request of a third party to verify authenticity of the electronic document; and responsive to determining that the third party is within a set of verifying users, providing the generated proof data to the third party.

12. The computer system of claim 10, wherein the IPFS distributed storage system is private.

13. The computer system of claim 10, wherein storing the electronic document within the IPFS distributed storage system comprises encrypting the electronic document using a symmetric key corresponding to the user prior to the storing.

14. The computer system of claim 10, wherein the request to establish verification of authenticity of the electronic document specifies a given set of verifying users, and wherein the proof data is a web page to which only the given set of verifying users is granted access.

15. The computer system of claim 10, wherein the user cannot trade the NFT over the distributed system.

16. The computer system of claim 10, the actions further comprising:

obtaining, from the user, the second electronic document embodying a change to the electronic document;

storing the second electronic document within the IPFS distributed storage system;

generating a second NFT representing the second electronic document, pointing to a location at which the second electronic document was stored within the IPFS distributed storage system, and referring to the NFT of the electronic document; and storing the second NFT in the private blockchain.

17. The computer system of claim 10, the actions further comprising displaying, to the user, graphical representations of electronic documents stored in the IPFS distributed storage system that correspond to NFTs that are stored in the private blockchain in association with the user, wherein the user requests to establish verification of authenticity of the electronic document by selecting the electronic document from amongst the displayed graphical representations.

* * * * *